US011190539B2

(12) United States Patent
Satish et al.

(10) Patent No.: US 11,190,539 B2
(45) Date of Patent: *Nov. 30, 2021

(54) MODIFYING INCIDENT RESPONSE TIME PERIODS BASED ON CONTAINMENT ACTION EFFECTIVENESS

(71) Applicant: Splunk Inc., San Francisco, CA (US)

(72) Inventors: Sourabh Satish, Fremont, CA (US);
Oliver Friedrichs, Woodside, CA (US);
Atif Mahadik, Fremont, CA (US);
Govind Salinas, Sunnyvale, CA (US)

(73) Assignee: Splunk Inc., San Francisco, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/699,299

(22) Filed: Nov. 29, 2019

(65) Prior Publication Data

US 2020/0213348 A1 Jul. 2, 2020

Related U.S. Application Data

(63) Continuation of application No. 16/142,913, filed on Sep. 26, 2018, now Pat. No. 10,554,687, which is a (Continued)

(51) Int. Cl.
*H04L 29/06* (2006.01)
*G06F 21/55* (2013.01)
(Continued)

(52) U.S. Cl.
CPC ........ *H04L 63/1441* (2013.01); *G06F 16/285* (2019.01); *G06F 21/554* (2013.01);
(Continued)

(58) Field of Classification Search
CPC ............ H04L 63/0236; H04L 63/1416; H04L 63/1425; H04L 63/20; H04L 47/2425;
(Continued)

(56) References Cited

U.S. PATENT DOCUMENTS 6,405,318 B1 6/2002 Rowland
7,076,803 B2 7/2006 Bruton et al.
(Continued)

OTHER PUBLICATIONS

Final Office Action received for U.S. Appl. No. 16/182,914, dated Sep. 18, 2019, 6 pages.
(Continued)

*Primary Examiner* — Edward Zee
(74) *Attorney, Agent, or Firm* — Nicholson De Vos Webster & Elliott LLP

(57) ABSTRACT

Systems, methods, and software described herein provide for managing service level agreements (SLAs) for security incidents in a computing environment. In one example, an advisement system identifies a rule set for a security incident based on enrichment information obtained for the security incident, wherein the rule set is associated with action recommendations to be taken against the incident. The advisement system further identifies a default SLA for the security incident based on the rule set, and obtains environmental characteristics related to the security incident. Based on the environmental characteristics, the advisement system determines a modified SLA for the security incident.

20 Claims, 6 Drawing Sheets

Related U.S. Application Data continuation of application No. 15/845,963, filed on Dec. 18, 2017, now Pat. No. 10,116,687, which is a continuation of application No. 14/689,926, filed on Apr. 17, 2015, now Pat. No. 9,871,818.

(60) Provisional application No. 62/087,025, filed on Dec. 3, 2014, provisional application No. 62/106,830, filed on Jan. 23, 2015, provisional application No. 62/106,837, filed on Jan. 23, 2015.

(51) Int. Cl.
*G06F 16/28* (2019.01)
*H04L 12/851* (2013.01)

(52) U.S. Cl.
CPC ...... *H04L 63/0236* (2013.01); *H04L 63/1416* (2013.01); *H04L 63/1425* (2013.01); *H04L 63/1433* (2013.01); *H04L 63/20* (2013.01); *H04L 47/2425* (2013.01)

(58) Field of Classification Search
CPC .............. H04L 63/1433; H04L 63/1441; G06F 16/285; G06F 21/552; G06F 21/554; G06F 21/55; G06F 21/50
See application file for complete search history.

(56) References Cited

U.S. PATENT DOCUMENTS

| | | |
|---|---|---|
| 7,127,743 B1 | 10/2006 | Khanolkar et al. |
| 7,174,566 B2 | 2/2007 | Satyendra |
| 7,469,301 B2 | 12/2008 | Daniell et al. |
| 7,617,533 B1 | 11/2009 | Hernacki |
| 7,900,259 B2 | 3/2011 | Jeschke et al. |
| 7,950,056 B1 | 5/2011 | Satish et al. |
| 8,042,171 B1 | 10/2011 | Nordstrom et al. |
| 8,103,875 B1 | 1/2012 | Ramzan et al. |
| 8,146,147 B2 | 3/2012 | Litvin et al. |
| 8,185,953 B2 | 5/2012 | Rothstein et al. |
| 8,261,317 B2 | 9/2012 | Litvin et al. |
| 8,271,642 B1 | 9/2012 | Sankararaman et al. |
| 8,291,495 B1 | 10/2012 | Burns et al. |
| 8,380,828 B1 | 2/2013 | Schlichter et al. |
| 8,402,540 B2 | 3/2013 | Kapoor et al. |
| 8,484,338 B2 | 7/2013 | Paster |
| 8,516,575 B2 | 8/2013 | Burnside et al. |
| 8,627,466 B2 | 1/2014 | Fisher et al. |
| 8,676,970 B2 | 3/2014 | Boyns et al. |
| 8,756,697 B2 | 6/2014 | Ocepek et al. |
| 8,856,910 B1 | 10/2014 | Rostami-Hesarsorkh et al. |
| 8,914,878 B2 | 12/2014 | Burns et al. |
| 8,924,469 B2 | 12/2014 | Raleigh et al. |
| 8,943,123 B2 | 1/2015 | Miyazaki et al. |
| 8,949,931 B2 | 2/2015 | Ermagan et al. |
| 8,955,107 B2 | 2/2015 | Eyada |
| 9,009,814 B1 | 4/2015 | Wertz et al. |
| 9,009,824 B1 | 4/2015 | Chen et al. |
| 9,049,226 B1 | 6/2015 | Duane |
| 9,166,995 B1 | 10/2015 | Roundy |
| 9,231,964 B2 | 1/2016 | Cross et al. |
| 9,256,739 B1 | 2/2016 | Roundy et al. |
| 9,306,965 B1 | 4/2016 | Grossman et al. |
| 9,311,479 B1 | 4/2016 | Manni et al. |
| 9,313,211 B1 | 4/2016 | Lototskiy |
| 9,325,733 B1 | 4/2016 | Kolman et al. |
| 9,336,385 B1 | 5/2016 | Spencer et al. |
| 9,338,181 B1 | 5/2016 | Burns et al. |
| 9,344,445 B2 | 5/2016 | Burns et al. |
| 9,378,361 B1 | 6/2016 | Yen et al. |
| 9,396,592 B2 | 7/2016 | Chapman et al. |
| 9,489,516 B1 | 11/2016 | Lu et al. |
| 9,712,555 B2 | 7/2017 | Satish et al. |
| 9,729,572 B1 | 8/2017 | Adams et al. |
| 9,762,607 B2 | 9/2017 | Satish et al. |
| 9,871,818 B2 | 1/2018 | Satish et al. |
| 9,954,888 B2 | 4/2018 | Satish et al. |
| 10,158,663 B2 | 12/2018 | Satish et al. |
| 10,257,227 B1 | 4/2019 | Stickle et al. |
| 10,425,440 B2 | 9/2019 | Satish et al. |
| 10,425,441 B2 | 9/2019 | Satish et al. |
| 10,476,905 B2 | 11/2019 | Satish et al. |
| 2004/0003286 A1* | 1/2004 | Kaier .................... G06F 21/554 726/25 |
| 2004/0054498 A1 | 3/2004 | Alexander |
| 2004/0111637 A1 | 6/2004 | Baffes et al. |
| 2004/0250133 A1 | 12/2004 | Lim |
| 2005/0055578 A1 | 3/2005 | Wright et al. |
| 2005/0235360 A1 | 10/2005 | Pearson |
| 2005/0273857 A1 | 12/2005 | Freund |
| 2006/0048209 A1 | 3/2006 | Shelest et al. |
| 2006/0059568 A1 | 3/2006 | Smith-Mickelson et al. |
| 2006/0095965 A1 | 5/2006 | Phillips et al. |
| 2006/0117386 A1 | 6/2006 | Gupta et al. |
| 2006/0174342 A1 | 8/2006 | Zaheer et al. |
| 2007/0168874 A1* | 7/2007 | Kloeffer .................... G06F 8/65 715/764 |
| 2008/0005782 A1 | 1/2008 | Aziz |
| 2008/0082662 A1 | 4/2008 | Dandliker et al. |
| 2008/0289028 A1 | 11/2008 | Jansen et al. |
| 2009/0037548 A1 | 2/2009 | Ordille et al. |
| 2010/0100962 A1 | 4/2010 | Boren |
| 2010/0162347 A1 | 6/2010 | Barile |
| 2010/0169973 A1 | 7/2010 | Kim et al. |
| 2010/0251329 A1 | 9/2010 | Wei |
| 2010/0319004 A1 | 12/2010 | Hudson et al. |
| 2010/0319069 A1 | 12/2010 | Granstedt et al. |
| 2010/0325412 A1 | 12/2010 | Norrman et al. |
| 2010/0325685 A1 | 12/2010 | Sanbower |
| 2011/0161452 A1 | 6/2011 | Poornachandran et al. |
| 2012/0210434 A1 | 8/2012 | Curtis et al. |
| 2012/0224057 A1 | 9/2012 | Gill et al. |
| 2012/0331553 A1 | 12/2012 | Aziz et al. |
| 2013/0007882 A1 | 1/2013 | Devarajan et al. |
| 2013/0081141 A1 | 3/2013 | Anurag |
| 2013/0291106 A1 | 10/2013 | Simonoff et al. |
| 2013/0312092 A1 | 11/2013 | Parker |
| 2014/0082726 A1 | 3/2014 | Dreller et al. |
| 2014/0089039 A1 | 3/2014 | McClellan |
| 2014/0137257 A1 | 5/2014 | Martinez et al. |
| 2014/0165200 A1 | 6/2014 | Anurag |
| 2014/0165207 A1 | 6/2014 | Engel et al. |
| 2014/0199663 A1 | 7/2014 | Sadeh-Koniecpol et al. |
| 2014/0237599 A1 | 8/2014 | Gertner et al. |
| 2014/0259170 A1 | 9/2014 | Amsler |
| 2014/0310811 A1 | 10/2014 | Hentunen |
| 2014/0344926 A1 | 11/2014 | Cunningham et al. |
| 2014/0351441 A1 | 11/2014 | Madani et al. |
| 2014/0351940 A1 | 11/2014 | Loder et al. |
| 2015/0040217 A1 | 2/2015 | Abuelsaad et al. |
| 2015/0215325 A1 | 7/2015 | Ogawa |
| 2015/0222647 A1 | 8/2015 | Lietz et al. |
| 2015/0304169 A1 | 10/2015 | Milman et al. |
| 2015/0334132 A1 | 11/2015 | Zombik et al. |
| 2015/0341384 A1 | 11/2015 | Mandayam et al. |
| 2015/0347751 A1 | 12/2015 | Card et al. |
| 2015/0365438 A1 | 12/2015 | Carver et al. |
| 2015/0381641 A1 | 12/2015 | Cabrera et al. |
| 2015/0381649 A1 | 12/2015 | Schultz et al. |
| 2016/0006749 A1 | 1/2016 | Cohen et al. |
| 2016/0065608 A1 | 3/2016 | Futty |
| 2016/0072836 A1 | 3/2016 | Hadden et al. |
| 2016/0103992 A1 | 4/2016 | Roundy et al. |
| 2016/0119379 A1 | 4/2016 | Nadkarni |
| 2016/0164893 A1 | 6/2016 | Levi |
| 2016/0241580 A1 | 8/2016 | Watters et al. |
| 2016/0241581 A1 | 8/2016 | Watters et al. |
| 2017/0237762 A1 | 8/2017 | Ogawa |

OTHER PUBLICATIONS

Final Office Action, U.S. Appl. No. 14/677,493, dated Jan. 16, 2020, 16 pages.

(56) References Cited

OTHER PUBLICATIONS

Non-Final Office Action from U.S. Appl. No. 16/142,913, dated Apr. 30, 2019, 33 pages.
Non-Final Office Action, U.S. Appl. No. 16/042,283, dated Jan. 24, 2020, 25 pages.
Non-Final Office Action, U.S. Appl. No., dated Mar. 19, 2020, 18 pages.
Notice of Allowance from U.S. Appl. No. 16/142,913, dated Aug. 30, 2019, 21 pages.
Notice of Allowance received for U.S. Appl. No. 16/107,979, dated Oct. 7, 2019, 14 pages.
Notice of Allowance, U.S. Appl. No. 14/675,176, dated Dec. 30, 2019, 6 pages.
Notice of Allowance, U.S. Appl. No. 16/182,914, dated Dec. 4, 2019, 5 pages.
Notice of Allowance from U.S. Appl. No. 15/699,454, dated Nov. 20, 2018, 6 pages.
Notice of Allowance from U.S. Appl. No. 15/845,963, dated Jun. 26, 2018, 11 pages.
Notice of Allowance from U.S. Appl. No. 15/886,183, dated Sep. 19, 2018, 9 pages.
Notice of Allowance from U.S. Appl. No. 15/924,759, dated Jun. 13, 2019, 21 pages.
Notice of Allowance from U.S. Appl. No. 16/107,972, dated May 9, 2019, 18 pages.
Notice of Allowance from U.S. Appl. No. 16/107,975, dated May 13, 2019, 18 pages.
Paudice, Andrea; Sarkar; Santonu; Cotroneo, Dominco; "An Experiment with Conceptual Clustering for the Analysis of Security Alerts", IEEE International Symposium on Software Reliability Engineering Workshops, Nov. 3-6, 2014, pp. 335-340.
Final Office Action, U.S. Appl. No. 14/675,176, dated Jan. 26, 2021, 18 pages.
Final Office Action, U.S. Appl. No. 16/568,949, dated Oct. 28, 2020, 19 pages.
Final Office Action, U.S. Appl. No. 16/736,120, dated Jan. 6, 2021, 15 pages.
Hasegawa, Hirokazu; Yamaguchi, Yukiko; Shimada, Hajime; Takakura; Hiroki; "A Countermeasure Recommendation System against Targeted Attacks with Preserving Continuity of Internal Networks", 38th Annual Computer Software and Applications Conference, IEEE, Jul. 21-25, 2014, pp. 400-405.
Hershey, Paul C., Ph.D.; Silio, Jr., Charles B., Ph.D.; "Procedure for Detection of and Response to Distributed Denial of Service Cyber Attacks on Complex Enterprise Systems", International Systems Conference SysCon, IEEE, Mar. 19-22, 2012, 6 pages.
Non-Final Office Action, U.S. Appl. No. 16/736,120, dated Sep. 22, 2020, 14 pages.
Notice of Allowance, U.S. Appl. No. 14/677,493, dated Jan. 22, 2021, 6 pages.
Notice of Allowance, U.S. Appl. No. 16/539,918, dated Jan. 22, 2021, 7 pages.
Notice of Allowance, U.S. Appl. No. 16/568,949, dated Jan. 7, 2021, 9 pages.
Tejay, Gurvirender P.S.; Zadig, Sean M.; "Investigating the Effectiveness of IS Security Countermeasures Towards Cyber Attacker Deterrence", 45th Hawaii International Conference on System Sciences, IEEE, Jan. 4-7, 2012, pp. 3051-3060.
Non-Final Office Action, U.S. Appl. No. 14/675,176, dated Jul. 14, 2020, 18 pages.
Non-Final Office Action, U.S. Appl. No. 14/677,493, dated Jul. 14, 2020, 18 pages.
Non-Final Office Action, U.S. Appl. No. 16/539,918, dated Jul. 16, 2020, 14 pages.
Notice of Allowance, U.S. Appl. No. 14/868,553, dated Jun. 26, 2020, 8 pages.
Notice of Allowance, U.S. Appl. No. 16/042,283, dated Jul. 28, 2020, 17 pages.
Abandonment from U.S. Appl. No. 14/675,075, Feb. 8, 2017, 2 pages.
Advisory Action from U.S. Appl. No. 14/868,553, dated Jan. 24, 2019, 3 pages.
Aguirre, Idoia; Alonso, Sergio; "Improving the Automation of Security Information Management: A Collaborative Approach", IEEE Security & Privacy, vol. 10, Issue 1, Oct. 25, 2011, pp. 55-59.
Final Office Action from U.S. Appl. No. 14/674,679, dated Sep. 22, 2016, 19 pages.
Final Office Action from U.S. Appl. No. 14/675,176, dated Nov. 25, 2016, 21 pages.
Final Office Action from U.S. Appl. No. 14/675,176, dated Sep. 25, 2017, 31 pages.
Final Office Action from U.S. Appl. No. 14/677,493, dated Aug. 24, 2017, 29 pages.
Final Office Action from U.S. Appl. No. 14/677,493, dated Nov. 13, 2018, 20 pages.
Final Office Action from U.S. Appl. No. 14/824,262, dated Apr. 6, 2017, 22 pages.
Final Office Action from U.S. Appl. No. 14/868,553, dated Oct. 15, 2018, 19 pages.
Final Office Action from U.S. Appl. No. 14/868,553, dated Oct. 18, 2017, 31 pages.
Final Office Action from U.S. Appl. No. 14/956,589, dated Nov. 22, 2017, 27 pages.
Final Office Action from U.S. Appl. No. 15/924,759, dated Aug. 1, 2018, 13 pages.
Final Office Action from U.S. Appl. No. 16/107,979, dated Jun. 13, 2019, 14 pages.
Final Office Action from U.S. Appl. No. 14/677,493, dated Nov. 25, 2016, 23 pages.
Non-Final Office Action from U.S. Appl. No. 15/886,183, dated Mar. 22, 2018, 21 pages.
Non-Final Office Action from U.S. Appl. No. 16/107,972, dated Dec. 31, 2018, 11 pages.
Non-Final Office Action from U.S. Appl. No. 14/674,679, dated Jun. 2, 2016, 16 pages.
Non-Final Office Action from U.S. Appl. No. 14/675,075, dated Jul. 11, 2016, 13 pages.
Non-Final Office Action from U.S. Appl. No. 14/675,176, dated Apr. 17, 2017, 22 pages.
Non-Final Office Action from U.S. Appl. No. 14/675,176, dated Jul. 18, 2016, 18 pages.
Non-Final Office Action from U.S. Appl. No. 14/677,493, dated Jul. 11, 2016, 17 pages.
Non-Final Office Action from U.S. Appl. No. 14/677,493, dated May 1, 2017, 25 pages.
Non-Final Office Action from U.S. Appl. No. 14/677,493, dated May 14, 2018, 23 pages.
Non-Final Office Action from U.S. Appl. No. 14/689,926, dated May 8, 2017, 34 pages.
Non-Final Office Action from U.S. Appl. No. 14/689,973, dated Jan. 25, 2017, 18 pages.
Non-Final Office Action from U.S. Appl. No. 14/824,262, dated Jul. 13, 2017, 20 pages.
Non-Final Office Action from U.S. Appl. No. 14/824,262, dated Oct. 7, 2016, 16 pages.
Non-Final Office Action from U.S. Appl. No. 14/868,553, dated Mar. 26, 2018, 22 pages.
Non-Final Office Action from U.S. Appl. No. 14/868,553, dated May 26, 2017, 45 pages.
Non-Final Office Action from U.S. Appl. No. 14/956,589, dated May 31, 2017, 33 pages.
Non-Final Office Action from U.S. Appl. No. 14/956,615, dated Jul. 28, 2017, 46 pages.
Non-Final Office Action from U.S. Appl. No. 15/699,454, dated Feb. 8, 2018, 19 pages.
Non-Final Office Action from U.S. Appl. No. 15/845,963, dated Feb. 12, 2018, 27 pages.
Non-Final Office Action from U.S. Appl. No. 15/924,759, dated Feb. 26, 2019, 20 pages.
Non-Final Office Action from U.S. Appl. No. 16/107,975, dated Jan. 4, 2019, 11 pages.
Non-Final Office Action from U.S. Appl. No. 16/107,979, dated Oct. 18, 2018, 14 pages.

(56) References Cited

OTHER PUBLICATIONS

Non-Final Office Action from U.S. Appl. No. 16/182,914, dated May 30, 2019, 23 pages.
Notice of Allowance from U.S. Appl. No. 14/674,679, dated Apr. 18, 2017, 20 pages.
Notice of Allowance from U.S. Appl. No. 14/674,679, dated Jun. 20, 2017, 5 pages.
Notice of Allowance from U.S. Appl. No. 14/674,679, dated May 12, 2017, 4 pages.
Notice of Allowance from U.S. Appl. No. 14/689,926, dated Dec. 20, 2017, 6 pages.
Notice of Allowance from U.S. Appl. No. 14/689,926, dated Nov. 8, 2017, 22 pages.
Notice of Allowance from U.S. Appl. No. 14/689,973, dated Aug. 10, 2017, 6 pages.
Notice of Allowance from U.S. Appl. No. 14/689,973, dated Jul. 27, 2017, 33 pages.
Notice of Allowance from U.S. Appl. No. 14/824,262, dated Jan. 5, 2018, 4 pages.
Notice of Allowance from U.S. Appl. No. 14/824,262, dated Nov. 22, 2017, 7 pages.
Notice of Allowance from U.S. Appl. No. 14/956,589, dated Apr. 23, 2018, 21 pages.
Notice of Allowance from U.S. Appl. No. 14/956,615, dated Dec. 18, 2017, 19 pages.
Notice of Allowance from U.S. Appl. No. 15/699,454, dated Aug. 9, 2018, 11 pages.

* cited by examiner

MODIFYING INCIDENT RESPONSE TIME PERIODS BASED ON CONTAINMENT ACTION EFFECTIVENESS

RELATED APPLICATIONS

This application is a continuation of, and claims the benefit of priority to, U.S. application Ser. No. 16/142,913, filed on Sep. 26, 2018, entitled "INCIDENT RESPONSE MANAGEMENT BASED ON ENVIRONMENTAL CHARACTERISTICS," which claims priority as a continuation of U.S. application Ser. No. 15/845,963, filed on Dec. 18, 2017, entitled "IMPROVED MANAGEMENT OF ADMINISTRATIVE INCIDENT RESPONSE BASED ON ENVIRONMENTAL CHARACTERISTICS ASSOCIATED WITH A SECURITY INCIDENT," which itself claims priority to U.S. application Ser. No. 14/689,926, filed on Apr. 17, 2015, entitled "MANAGING WORKFLOWS UPON A SECURITY INCIDENT," which claims priority to U.S. Provisional Patent Application No. 62/087,025, entitled "ACTION RECOMMENDATIONS FOR COMPUTING ASSETS BASED ON ENRICHMENT INFORMATION," filed on Dec. 3, 2014, U.S. Provisional Patent Application No. 62/106,830, entitled "ACTION RECOMMENDATIONS FOR ADMINISTRATORS IN A COMPUTING ENVIRONMENT," filed on Jan. 23, 2015, and U.S. Provisional Patent Application No. 62/106,837, entitled "SECURITY ACTIONS IN A COMPUTING ENVIRONMENT," filed on Jan. 23, 2015, all of which are hereby incorporated by reference in their entirety.

TECHNICAL FIELD

Aspects of the disclosure are related to computing environment security, and in particular to managing the allocation of workflows in response to a security incident.

TECHNICAL BACKGROUND

An increasing number of data security threats exist in the modern computerized society. These threats may include viruses or other malware that attacks the local computer of the end user, or sophisticated cyber attacks to gather data and other information from the cloud or server based infrastructure. This server based infrastructure includes real and virtual computing devices that are used to provide a variety of services to user computing systems, such as data storage, cloud processing, web sites and services, amongst other possible services. To protect applications and services, various antivirus, encryption, and firewall implementations may be used across an array of operating systems, such as Linux and Microsoft Windows.

Further, some computing environments may implement security information and event management (SIEM) systems and other security detection systems to provide real-time analysis of security alerts generated by network hardware and applications. In particular, STEM systems allow for real-time monitoring, correlation of events, notifications, and console views for end users. Further, SIEM systems may provide storage logs capable of managing historical information about various security events within the network. Although SIEMs and other security threat identifying systems may generate security alerts for devices within the network, administrators may be forced to translate each of these alerts into particular actions, which takes time and resources. Further, notifications of incidents may not be helpful in determining which administrator of a plurality of administrators should be responsible for reacting to a security incident.

OVERVIEW

The technology disclosed herein enhances how security action recommendations are provided to administrators of a computing environment. In one example, an advisement system for managing service level agreements (SLAs) for security incidents in a computing environment is configured to identify a rule set for a security incident based on enrichment information obtained for the security incident, wherein the rule set is associated with one or more action recommendations to be taken against the security incident. The advisement system is further configured to identify a default SLA for the security incident based on the rule set, and obtain environmental characteristics related to the security incident. Based on the environmental characteristics, the advisement system determines a modified SLA for the security incident.

In some implementations, the default SLA and the modified SLA each comprise a hierarchy of administrators to respond to a security incident, and a set of one or more time periods for administrator selected actions.

In some implementations, the advisement system may further be configured to provide the action recommendations to administrators based on the SLA determinations for the security incident.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
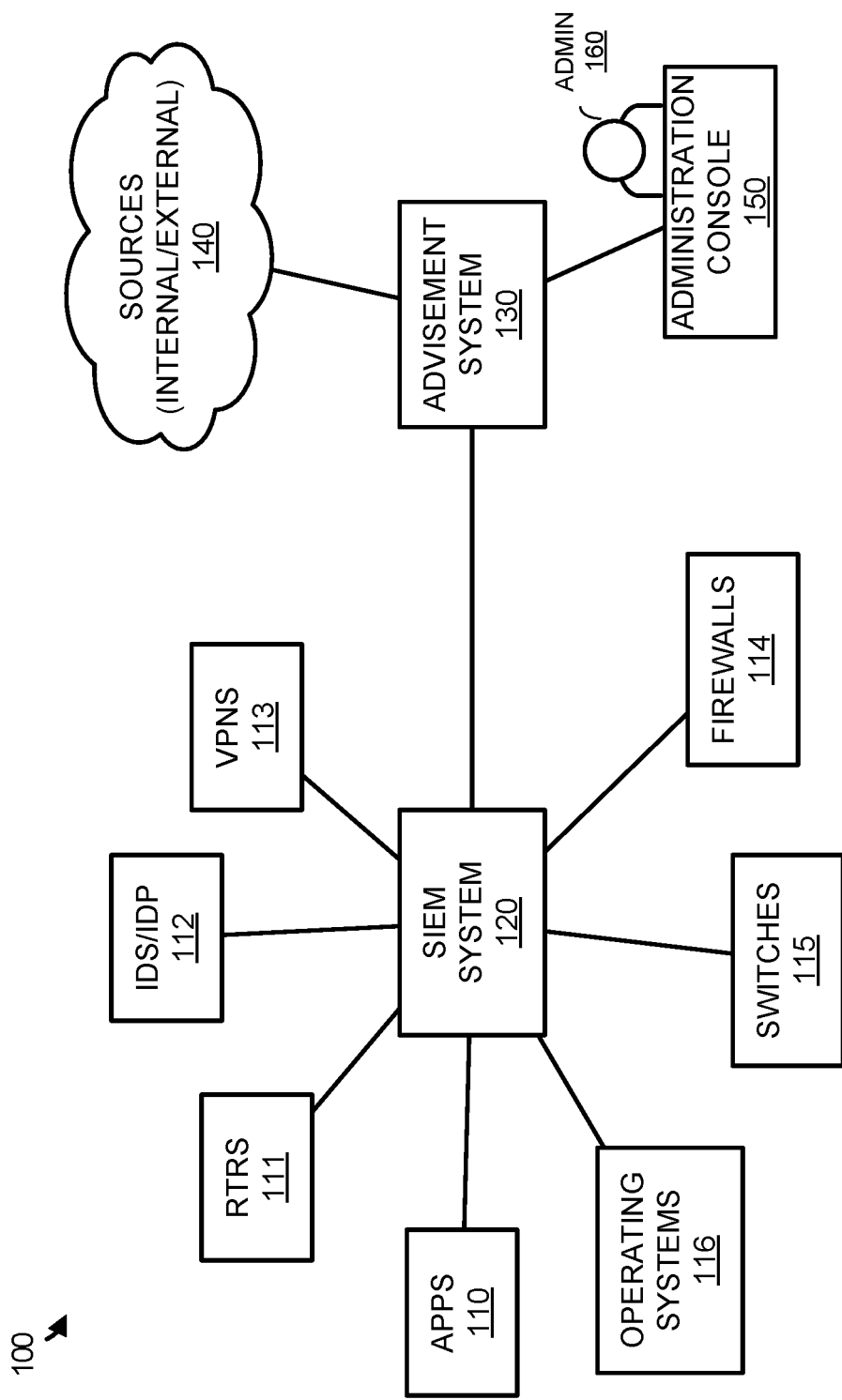
FIG. 1 illustrates a computing environment to manage security actions for a plurality of network assets.

The various examples disclosed herein provide enhancements for managing service level agreements (SLAs) for security incidents in a computing environment. In many organizations, security systems, such as security information and event management (STEM) systems provide real-time analysis of security alerts generated by network hardware and processes. The network hardware and processes may include routers, firewalls, operating systems and applications executing on one or more computing devices, switches, or intrusion detection systems, amongst a variety of other network devices and processes. During the analysis of the particular network, a SIEM system may identify an issue, and flag the issue as a possible security threat. Once flagged, the STEM system may provide information to an administrator, or store information about the threat to be analyzed for a possible solution.

Here, in addition to the operations provided by the STEM system or other security monitoring systems within a computing environment, an advisement system may be used to identify, implement, and recommend security actions to be taken against security threats. For example, if a STEM system identified a possible security threat within an asset of a computing environment, information about the threat could be transferred to the advisement system, supplementary information about the threat could be identified, and actions could be taken against the threat based on a preconfigured rule set. These actions may include a variety of procedures that eliminate, segregate, monitor, or provide other similar actions on the identified threat. In some examples, the advisement system may be configured to implement a default action without user interaction against the threat. However, in addition to or in place of the default action, one or more suggested actions may be provided to an administrator, and the administrator may select the one or more actions to be taken against the security threat. The actions taken may include taking a snapshot of the affected computing asset, segregating the asset from other assets, removing an application related to the incident, blocking a particular internet protocol address related to the incident, or providing any other similar action to protect assets in the environment from the security incident—including combinations thereof.

In some implementations, SLAs may be associated with the rule set identified for the security threat, and include information about the hierarchy of administrators that should handle the selection of the security action in the environment, as well as time periods that are allowed for each of the administrators to respond to the particular threat. Although a default or original SLA may be associated with a particular rule set. This rule set may be modified based on environmental characteristics for the threat. In particular, the SLA may be modified based on a criticality rating of the computing asset associated with the threat, a current severity level of the security threat within the environment, a rate of events for the security incident, current market conditions, geopolitical conditions, or other similar environmental characteristics. For example, the advisement system may determine that there are a large number of incoming requests from a known malicious interne protocol (IP) address. Accordingly, the amount of time for the administrator to select an action for the threat may be decreased to ensure that an action is taken. Similarly, in addition to or in place of reducing the amount of time to respond, the hierarchy of administrators for responding to the incident could be changed, such that new administrators may be responsible for implementing the necessary action.

In some examples, in response to identifying a security incident in the environment, the advisement system may implement a first action to contain the particular incident. This may be accomplished using virtual local area networks (VLANs) for systems involved in the threat, preventing networked communication for the infected device, or other similar containment reactions for an incident. In addition to the containment action, which may be initiated as a default instruction or by user instruction, one or more action recommendations may be provided to an administrator to remove the particular security threat from the environment.

In that example, the amount of time to respond may be modified based on the effectiveness of the containment action. For instance, if the containment of the security threat prevented the threat with communicating with other systems, the period of time to implement an action to remove the threat could be made longer. In contrast, if the containment action were not effective, the period of time to implement an action remove the threat may be made shorter, as the threat creates possible issues for other security assets in the environment.

In some instances, the SLA hierarchy of administrators may require multiple administrators to approve an action before it is implemented in the system. For example, two administrators or users of the computing assets may be required to agree on an action before it can be applied to the computing assets. Further, once a set of action recommendations are provided to an administrator, the administrator may modify the action recommendations, remove action recommendations, or defer action selection to another administrator or set of administrators, or provide other similar feedback with regards to the action recommendations. For instance, the administrator may be provided with a list IP addresses to be blocked on a computing asset. However, the administrator may select one or more of the IP addresses to prevent the addresses from being blocked by the computing system. In response to the feedback from the administrator, the action recommendations may be modified in accordance with the feedback, or may be implemented with the administrator selected modifications.

To further illustrate the operation of an advisement system within a computing network, FIG. 1 is provided. FIG. 1 illustrates a computing environment 100 to manage security actions for a plurality of network assets. Computing environment 100 includes computing assets 110-116, STEM system 120, advisement system 130, sources 140, and administration system 150. Computing assets 110-116 include applications 110, routers 111, intrusion detection systems and intrusion prevention system (IDS/IDP) 112, virtual private networks (VPNs) 113, firewalls 114, switches 115, and operating systems 116, although other assets may exist. Assets 110-116 may execute via any number of computing systems or devices. In addition to the routers and switches, these computing devices may include server computers, desktop computers, laptop computers, tablet computers, and the like. Although not illustrated in the present example, in some implementations, assets may be defined at computing system level. Accordingly, assets may be defined as physical computing systems, such as servers, end user computing systems, host computing systems, and the like, and may further be defined as virtual computing systems, such as virtual machines executing via host computing systems. These physical and virtual computing systems may include an operating system, applications, processes, firewalls, and other similar computing resources.

SIEM system 120, advisement system 130, internal and external sources 140, and administration system 150 may each include communication interfaces, network interfaces, processing systems, computer systems, microprocessors, storage systems, storage media, or some other processing devices or software systems, and can be distributed among multiple devices. STEM system 120, advisement system 130, and sources 140 may comprise one or more server, desktop, laptop, or other similar computing devices. Administration system 150 may comprise an end user device, such as a desktop computer, laptop computer, smartphone, tablet, or any other similar computing device.

Advisement system 130 communicates with SIEM system 120, sources 140, and administration system 150 via communication links that may use Time Division Multiplex (TDM), asynchronous transfer mode (ATM), internet protocol (IP), Ethernet, synchronous optical networking (SONET), hybrid fiber-coax (HFC), circuit-switched communication signaling, wireless communications, or some other communication format, including combinations and improvements thereof. Similarly, STEM system 120 may gather information from assets 110-116 via a plurality of communication links to the computing systems associated with the assets, wherein the links may use TDM, ATM, IP, Ethernet, SONET, HFC, circuit-switched communication signaling, wireless communications, or some other communication format, including combinations and improvements thereof. While not illustrated in the present example, it should be understood that advisement system 130 might communicate with the assets over various communication links and communication formats to implement desired security actions.

In operation, SIEM system 120 receives data and performance information from assets 110-116 and performs inspections to identify possible security issues. Once SIEM system 120 identifies a possible security threat, information about the security threat is transferred to advisement system 130. Advisement system 130 identifies the security threat and analyzes the threat using sources 140 to determine actions against the security threat. These actions might include default actions that can be initiated and implemented within the environment without interaction from an administrator, and might further include suggested actions that can be provided to administrator (admin) 160. Once the suggested actions are determined, the suggested actions are transferred, via email, text message, or other similar format, to administration system 150 to be presented to administrator (admin) 160. From the suggested actions, administrator 160 may select a particular action and advisement system 130 may implement the action within the computing environment.

In some implementations, SLAs may be used to define how an incident is handled in the environment, such as the amount of time that administrators have to implement an action for the threat, as well as define a hierarchy of administrators to handle the threat. For example, when a threat is identified, advisement system 130 may determine an SLA for the incident, which identifies a period of time for administrator 160 to implement an action before it is transferred to another administrator within the defined hierarchy.

Figure 2:
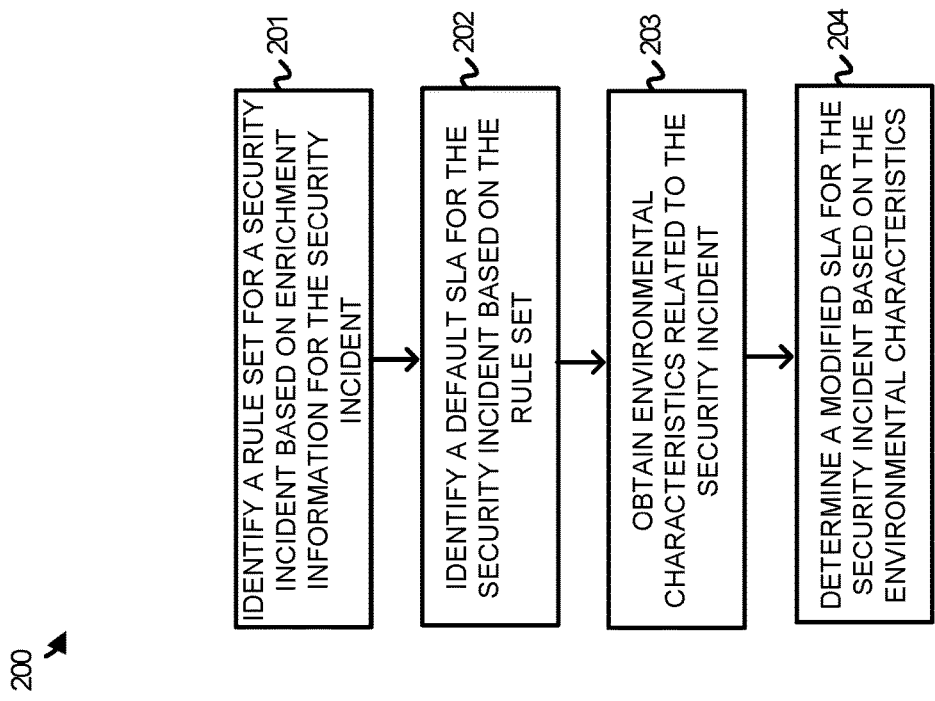
FIG. 2 illustrates a method of operating an advisement system to provide action recommendations for a plurality of network assets.

Referring now to FIG. 2 to further demonstrate the operation of advisement system 130. FIG. 2 illustrates a method 200 of operating advisement system 130 to manage SLAs for security incidents. As described above in FIG. 1, STEM system 120 receives information from a plurality of network assets 110-116 and identifies security threats to devices and systems based on the information. Once a threat is identified, the threat is then transferred to advisement system 130. Advisement system 130 identifies the security threat or incident within environment 100, and identifies a rule set for the security incident based on enrichment information for the security incident (201). In some examples, when the incident is identified by advisement system 130, information about the incident may be included, such as an outside IP address related to the incident, a process name that is related to the incident, a number of occurrences of the particular incident, a uniform resource locator (URL) related to the incident, an identifier for the computing asset associated with the incident, or any other similar information about the incident. Based on the information supplied for the incident, advisement system 130 may query or retrieve enrichment information about the particular threat from internal and external sources 140. These sources may include databases, websites, or any other repository that includes information about computer security threats.

Once the enrichment information is retrieved from the sources, a rule set may be determined for the particular incident. For example, an unknown process may be identified as a security incident within a computing asset. In response to identifying a name for the unknown process, advisement system 130 may query the sources to gather further information about the incident. Based on the enrichment information that is provided for the unknown process, a rule set may be determined along with associated action recommendations to take against the threat. Accordingly, if the enrichment information indicated that the threat was malware, a rule set and action recommendations may be made identified based on the malware identification.

In addition to the action recommendations, advisement system 130 further identifies a default SLA for the incident based on the rule set (202), which may include a hierarchy of administrators to respond to the incident, as well as one or more time periods for which they have to respond to the incident. For example, action recommendations may be provided to a first administrator that does not respond within a required time period. Accordingly, the recommendations may be provided to secondary administrators to ensure that a response is given to the incident.

Here, advisement system 130 further obtains environmental characteristics related to the security incident (203), and uses the characteristics to dynamically generate a modified SLA for the security incident (204). The environmental characteristics may include the criticality of the computing asset with the security incident, the number of occurrences of the incident within the environment, the severity of the incident, the current geopolitical climate when the issue took place, or other similar characteristics separate from the security incident itself. Once the characteristics are determined, various algorithms may be used to modify or adjust the default SLA for the current incident.

For example, a security incident that involved malware may have a predefined hierarchy of administrators, as well as a predefined time period for response. However, if the malware were on a critical financial officer's computing system with possibly sensitive data, the default SLA may be improper for handling that particular issue. Accordingly, based on the criticality of the asset, the hierarchy of administrators may change to remedy the security threat, and the time periods for which the administrators have to respond to the issue may be shortened due to the criticality of the asset.

In some implementations, the rule set for a particular threat may be associated with a default action that could be used to contain a particular threat. These containment default actions may include preventing future communications from an affect asset, placing the affected asset within a VLAN, or some other containment action. In addition to the containment action, user action suggestions may be generated for administrators responsible for the particular asset, which may be used to remove the incident from the computing asset. In some examples, the time period for an administrator to implement an action may be based on the effectiveness of the containment process. Accordingly, if the containment process prevented outgoing communications, or the spread of the security threat to other systems in the environment the administrators may be provided with a longer time period to implement an action. In contrast, if the containment action were not effective, a reduced period of time may be given to implement a user-defined action.

In some examples, the administrators may dynamically modify the security actions that are supplied. This dynamic modification may include denying a particular action, approving a particular action, delegating the responsibility of responding to the action to another administrator or set of administrators, modifying action parameters, such as IP addresses to be blocked, or some other dynamic modification to the action recommendations. For example, a first administrator may be provided with an action recommendation to block a set of IP addresses. During the review of the action, the administrator may select at least one IP address that does not need to be blocked. Once the IP address is no longer included in the blocked list, the first administrator or a second administrator may apply the modified action.

In some instances, multiple administrators may be required to implement a particular action. For example, a security administrator may select to implement a firewall rule for one or more computing assets in the environment. In response to selecting the action, administrators associated with the computing assets, which could be users of the computing assets, may be required to approve the change and implement processes to apply the firewall rule. Accordingly, rather than approval from a single administrator, multiple administrators or users may be required to approve an action before it can be implemented within the environment.

Although illustrated in FIG. 1 with a STEM system, it should be understood that in some examples other systems, such as the assets themselves within the computing environment, might be used to identify security threats. Further, although illustrated separate in the example of FIG. 1, it should be understood that STEM system 120 might reside wholly or partially on the same computing systems as advisement system 130.

Figure 3:
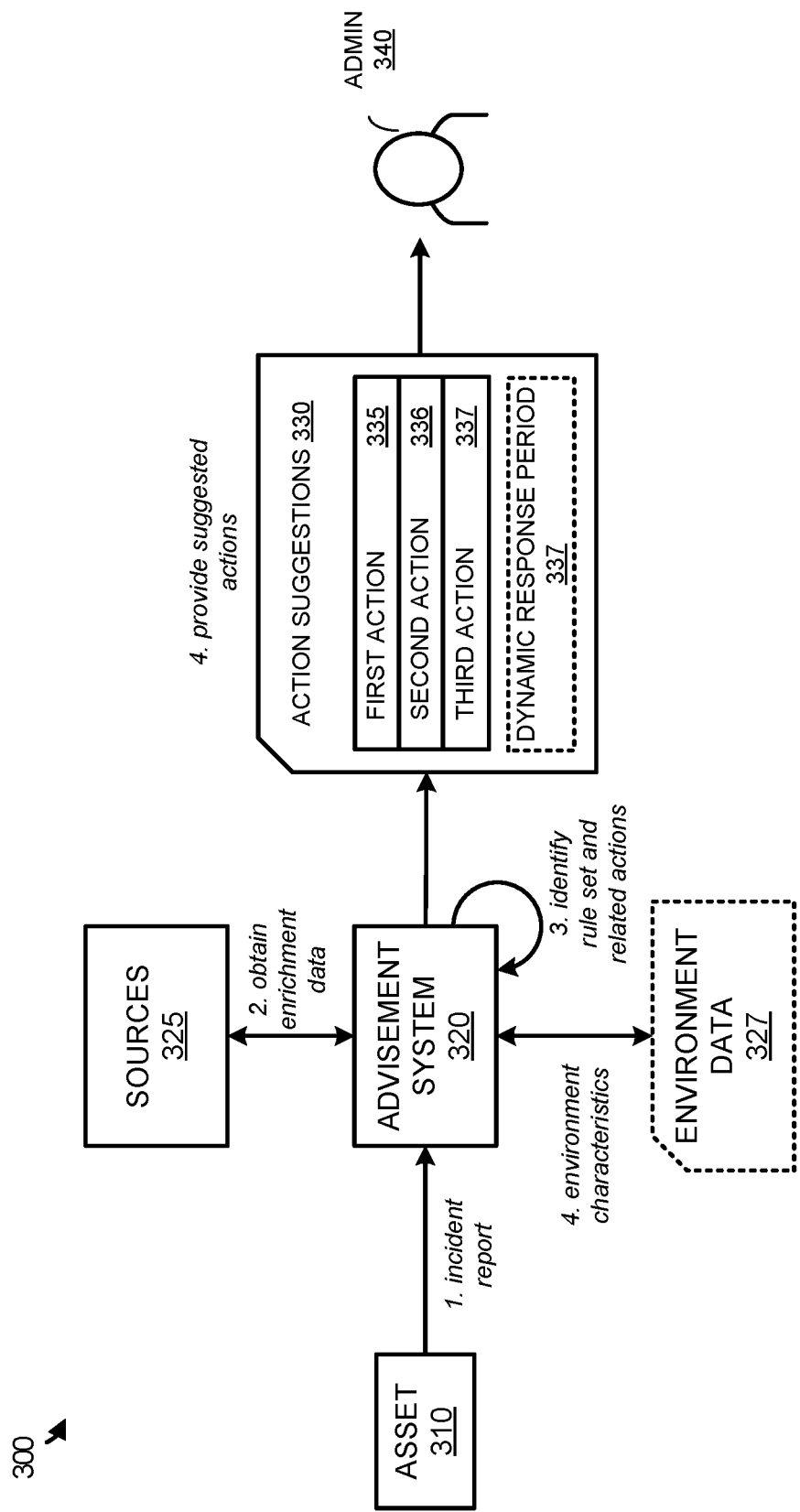
FIG. 3 illustrates an operational scenario of identifying security actions according to one example.

Turning to FIG. 3, FIG. 3 illustrates an operational scenario 300 of providing action recommendations to an administrator according to one example. Operational scenario 300 includes asset 310, advisement system 320, sources 325, environment data 327, action suggestions 330, and administrator 340. As described herein assets may comprise operating systems, virtual machines, application files, routers, switches, firewalls, or any other similar asset. Further, in some examples, assets may be defined as an entire computing system, such as a server or personal computing system, which includes an operating system, files, applications, and processes.

As described herein, security systems and processes, such as STEM systems, are configured to identify possible security incidents within a computing environment that includes a plurality of computing systems and assets. Here, asset 310 is identified with a security incident, and a report of the incident is transferred to advisement system 320. This incident report may be generated by an agent that is collocated on the same computing system or device as asset 310, or may be generated by an external system such as a SIEM that reports the incident to advisement system 320.

In response to the incident, advisement system 320 obtains enrichment data from sources 325, which may comprise databases, webpages, or other resources that store information about security threats. For example, a database may be maintained that includes recently identified malware applications. Accordingly, if the incident report indicated an unknown application executing on an asset, the unknown application may be compared to the identified malware applications of the database to determine a rule set for the unknown application. In some implementations, to manage the various rule sets for the advisement system, one or more data structures may be accessible by the advisement system that relates rule sets to enrichment information about the incident. For example, an incident may be reported for an unknown process executing on a virtual machine asset. Once enrichment information is gathered about the unknown process, the advisement system may identify a rule set that applies to unknown the enrichment information determined about the unknown process for the virtual machine. Accordingly, an unknown process that is known to be malicious from the enrichment information may be associated with a different rule set than an unknown process that cannot be confirmed to be malicious.

Upon determining the rule set, advisement system 320 may identify action suggestions 330 that are related to the particular rule set. Further, a default SLA may be determined for the incident, based on the rule set that indicates which administrator or administrators are responsible to take action against the particular incident, and further specifies the amount of time that each administrator has to respond to a particular issue.

Once the default SLA is determined for the incident, the SLA may be modified based on environment data 327. Environment data 327 may include the severity of the incident within the environment, the number of occurrences of the incident within the environment, the geopolitical state, or other similar information related to the threat. For example, environment data 327 may indicate that an unknown IP address is frequently attempting to contact a computing asset within the computing environment. To modify the SLA, advisement system 320 may reduce or increase the amount of time that each administrator has to respond to an incident based on environment data 327, and may change the personnel that are responsible for the incident based on environment data 327. Referring to the unknown IP address example from above, based on the frequent attempts of the unknown IP address, advisement system 320 may reduce the amount of time that the administrator has to respond or refer the incident to another administrator.

As illustrated in FIG. 3, action suggestions 330 continue to be provided to administrator 340, allowing the administrator to make an action selection for the environment. However, dynamic response period 337 is included with action suggestions 330, indicating a period of time for which administrator 340 has to respond. Dynamic response period 337 may decrease if the incident is critical or severe based on environment data 327, or may increase if the incident is determined to be less severe based on environment data 327.

In the present example, only one administrator is illustrated, however, it should be understood that action suggestions might be provided to multiple administrators in some instances. Here, if administrator 340 makes a selection of actions 335-337 within dynamic response period 337, advisement system 320 may initiate implementation of the action within the computing environment. In some examples, advisement system 320 may provide administrator 340 with a workflow that guides the administrator through the necessary steps of implementing the particular action. For example, if the action involved a firewall modification, advisement system 320 may include steps for the administrator to log into the associated computing asset, and implement the necessary procedures on the computing asset. In other implementations, advisement system 320 may include the ability to automate all or portions of the particular action selected by administrator 340. For example, advisement system 340 may identify the type of device and software provider associated with a particular modification and take preprogrammed steps to implement the required action.

In some implementations, administrator 340 may not respond to the incident within the time that is required by the SLA and dynamic response period 337. As a result, a default action may be taken by advisement system 320 to ensure that the incident does not remain active within the environment. This action may be the top ranked suggestion if a plurality of suggestions are provided to the administrator, or may be any other default action associated with the particular identified rule set.

Figure 4:
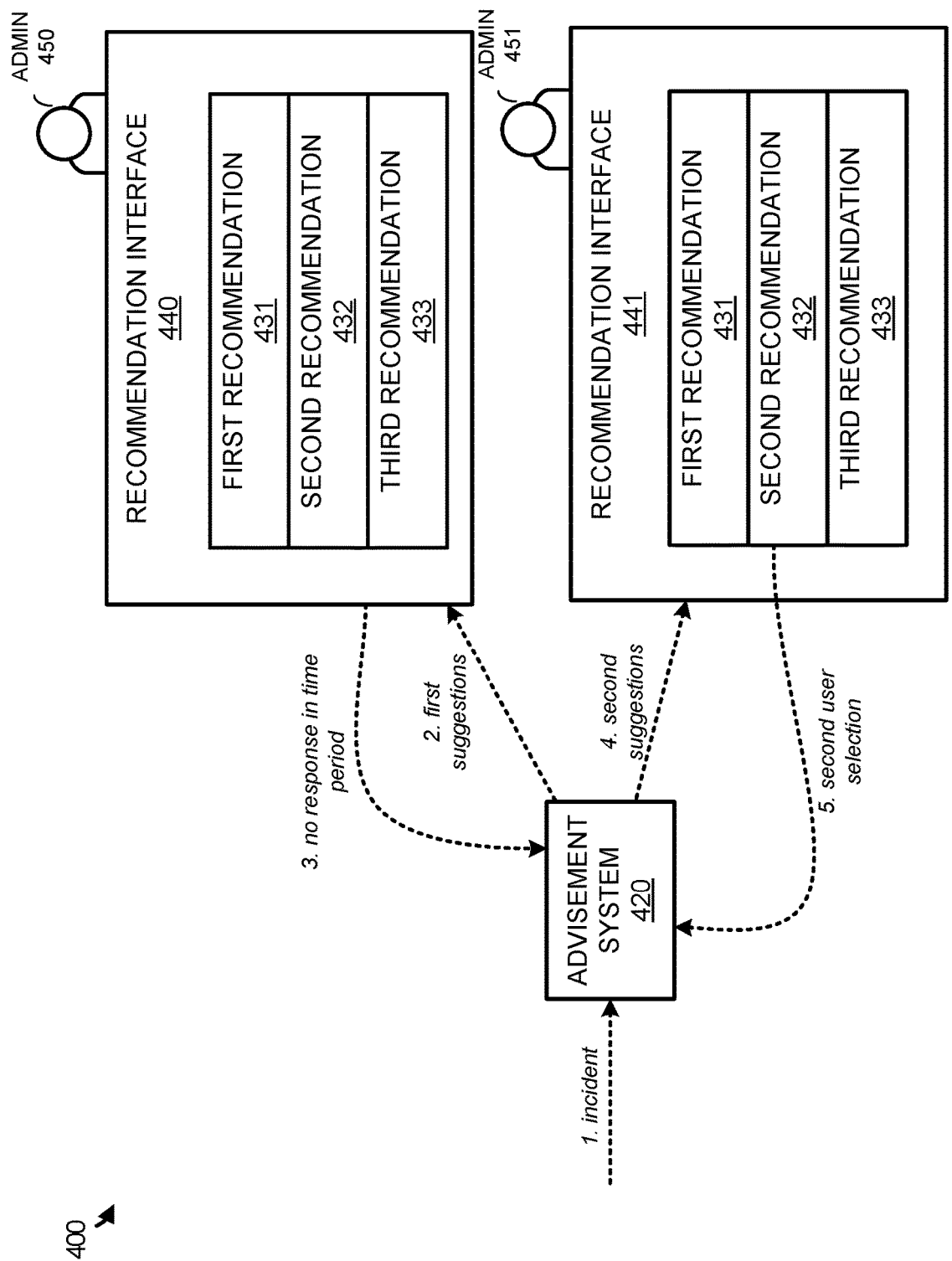
FIG. 4 illustrates an overview of providing action recommendations to an administrator based on previously implemented actions.

Turning to FIG. 4, FIG. 4 illustrates an operational scenario 400 of providing action recommendations to administrators within a defined hierarchy according to one implementation. Operational scenario 400 includes advisement system 420 and recommendation interface 440. Recommendation interface may be provided on advisement system 420 in some examples, or displayed to administrators 450-451 on console devices. The console devices may include, but are not limited to, desktop computing systems, laptop computing systems, tablet computers, and smartphones.

In operation, advisement system 420 identifies a security incident for an asset within a computing environment. This identification may be provided directly from the computing asset, or may be transferred from a STEM or other security systems within the network. In response to the incident, advisement system 420 determines a rule set for the incident based at least in part on enrichment data obtained from internal and/or external sources. These sources may include databases that store security threat information, websites that maintain records of possible security threats to computing assets of an environment, or some other similar sources that can be searched by advisement system 420. Once the rule set is determined action recommendations 431-433 may be identified and provided to associated administrators.

Here, in addition to identifying the action recommendations, the rule set may also identify a default SLA that is associated with the particular incident. This default SLA may include a hierarchy of administrators that should be used to respond to the incident, as well as a time period for each of the administrators to respond to the incident. This default SLA may then be modified based on environmental conditions that are associated within the incident. In particular the environmental conditions or characteristics may include information about how active the incident is in the environment, the criticality rating of the asset associated with the incident, which may be assigned by an administrator or may be based on the data included with the asset, or some other similar information. In modifying the SLA advisement system 420 may change the hierarchy of which administrators are responsible for initiating the actions within the environment, and may also modify the time periods that the administrators have to respond to the action.

As the modified SLA is determined, advisement system provides recommendation interface 440 for administrator 450. Upon expiration of the time period for receiving an action from administrator 450, suggestions are provided in recommendation interface 441 to administrator 451. Once presented, administrator 451 selects second recommendation 432 from recommendations 431-433 to be applied against the threat. Once selected, advisement system 420 may initiate a process to implement the action within the computing environment. This process may include providing a workflow to the administrator to implement the action, or implementing automated processes that are preconfigured for the hardware and software associated with the incident.

In some implementations, the modified SLA determinations may be made periodically or throughout the presence of the threat. For example, a first modified SLA may be determined based on first environmental characteristics related to the incident, and a second modified SLA may be determined based on second environmental characteristics related to the incident. As an example, a first modified SLA may be determined when an incident is not very active within the environment, however, as time progresses the incident may become more prevalent resulting in an increased number of reports associated with the incident. Accordingly, the hierarchy of administrators and/or the time period for response by the administrators may be changed to reflect the increased number of reports associated with the incident.

Although illustrated in the present example as providing the same action recommendations in both recommendation interface 440 and recommendation interface 441, it should be understood that in some examples the recommendations might change when they are provided to different administrators. Further, while only two administrators are illustrated in the present example, it should be understood that any number of administrators might be included within a hierarchy, including two or more administrators receiving actions at the same instance.

Figure 5:
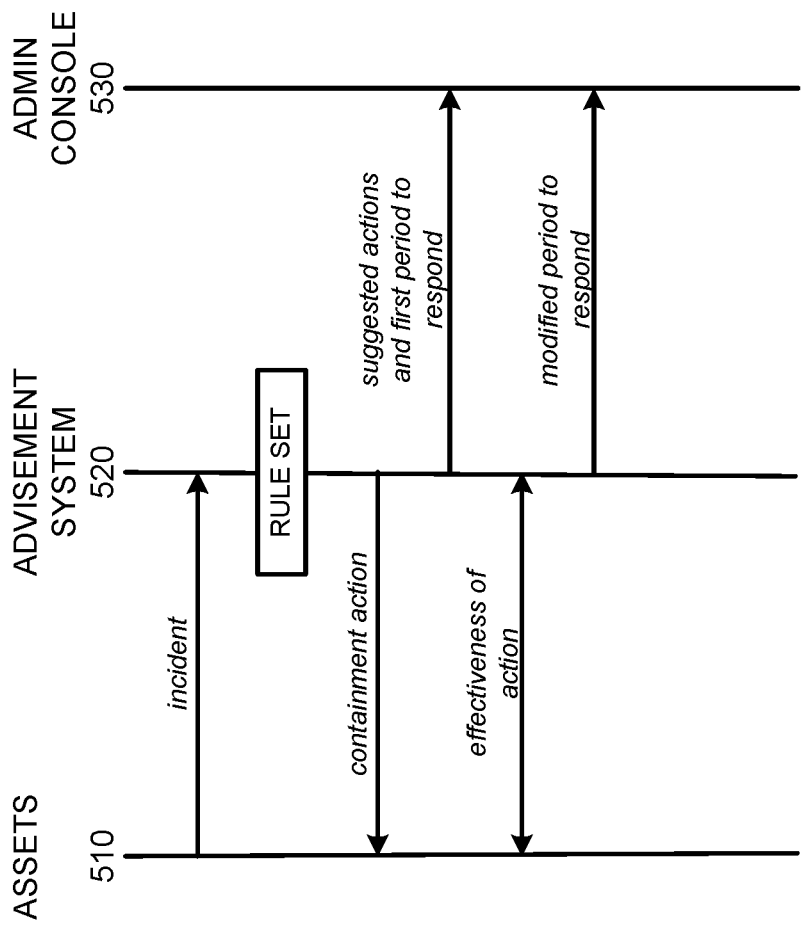
FIG. 5 illustrates a computing environment to recommend and implement security actions based on the effectiveness of previous actions.

Referring now to FIG. 5, FIG. 5 illustrates a timing diagram 500 for providing action recommendations to administrators based on containment of a security incident according to one implementation. FIG. 5 includes assets 510, advisement system 520, and administration console 530. Assets 510 may comprise real or virtual computing systems, software systems, routers, switches, and other similar assets as described herein. Advisement system 520 may comprise any device or system of devices capable of providing the security action services described herein. Administration console 530 may comprise any computing system, such as a desktop computer, laptop computer, tablet computer, smartphone, and the like.

As illustrated, advisement system 520 identifies a security incident in at least one asset of assets 510. In response to the incident, advisement system 520 may identify a rule set based on enrichment information for the incident. For example, the incident report may include a variety of information about the incident, including an IP address associated with the incident, an asset identifier with the incident, a process associated with the incident, or any other similar information about the incident. Using this information, advisement system 520 may obtain enrichment information for the incident from internal and external sources, and determine a rule set for the incident based on the enrichment information. Once the rule set is determined, advisement system 520 may take a containment action against the incident to prevent the spread of the incident to other computing assets in the environment.

Before, during, or after the containment action, suggested security actions determined for the rule set may be provided to administration console 530. These actions may be used to remove the incident from the environment rather than simply containing the incident. As illustrated in the present example, advisement system 520 further monitors the containment of the incident to determine the effectiveness of the action in assets 510, and modifies the period to respond for the administrator at administration console 530. For example, if the containment action in assets 510 was effective in containing the incident in the assets, then advisement system 520 may provide a longer time period for the administrator to select an action. In contrast, if advisement system 520 determined that the containment action were not effective in assets 510, then advisement system 520 may reduce the period to respond to the incident for the administrator.

Although not illustrated in the present example, it should be understood that if the administrator does not select and implement an action in the environment within the specified time period, advisement system 520 might implement a default action without the discretion of the administrator.

Figure 6:
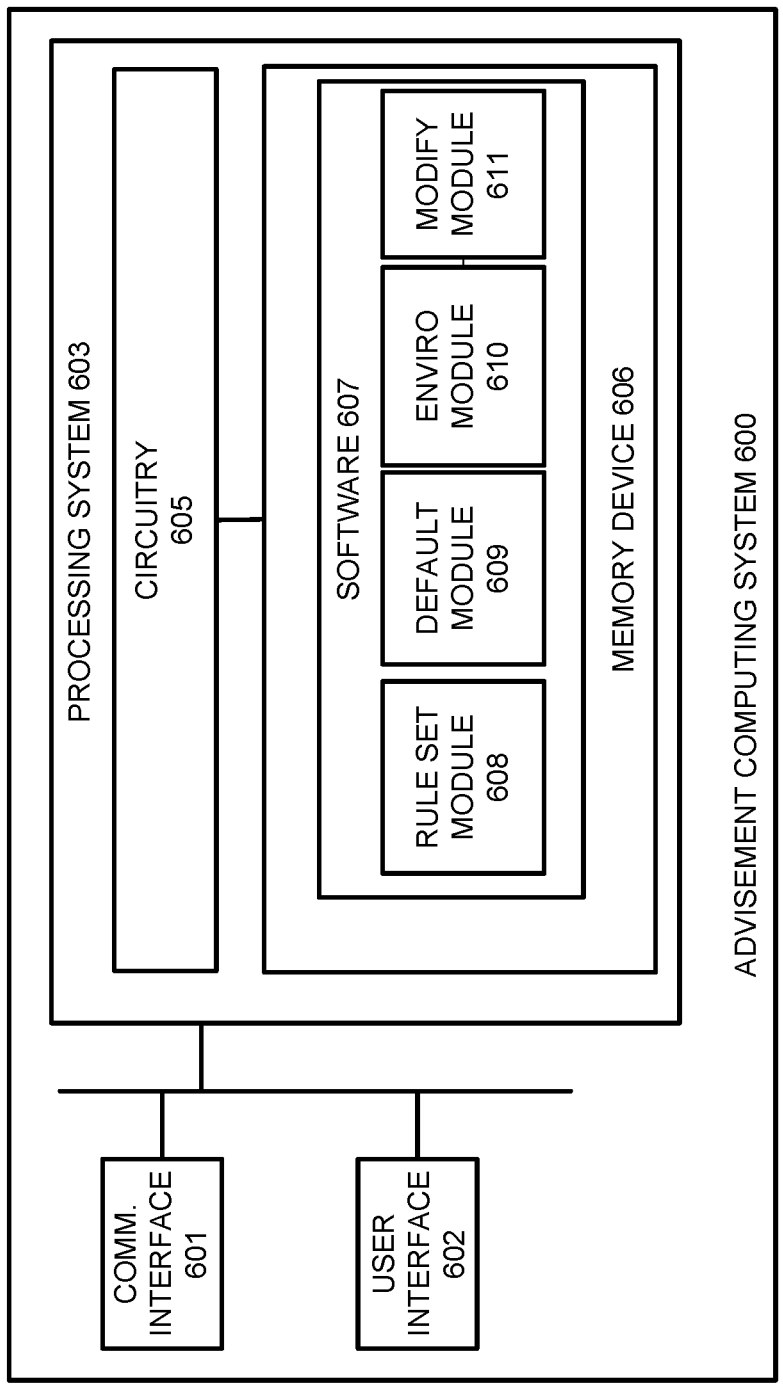
FIG. 6 illustrates an advisement computing system to provide action recommendations for a plurality of network assets.

Turning to FIG. 6, FIG. 6 illustrates an advisement computing system 600 to provide action recommendations for a plurality of network assets. Advisement computing system 600 is representative of a computing system that may be employed in any computing apparatus, system, or device, or collections thereof, to suitably implement the advisement systems described herein. Computing system 600 comprises communication interface 601, user interface 602, and processing system 603. Processing system 603 is communicatively linked to communication interface 601 and user interface 602. Processing system 603 includes processing circuitry 605 and memory device 606 that stores operating software 607.

Communication interface 601 comprises components that communicate over communication links, such as network cards, ports, radio frequency (RF) transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof. In particular, communication interface 601 may communicate with security identification systems, such as STEM systems, security systems on the assets themselves, or some other security identification system. Further, communication interface 601 may be configured to communicate with one or more administration consoles to provide the suggested actions to administrators, and the computing assets of the environment to implement selected actions.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes rule set module 608, default module 609, environment (enviro) module 610, and modify module 611 although any number of software modules may provide the same operation. Operating software 607 may further include an operating system, utilities, drivers, network interfaces, applications, or some other type of software. When executed by circuitry 605, operating software 607 directs processing system 603 to operate advisement computing system 600 as described herein.

In particular, rule set module 608, when executed by processing system 603, directs processing system 603 to determine a rule set for a security incident within a computing environment comprising a plurality of assets. To determine the rule set, advisement computing system 600 may identify a security incident within the computing environment that is either reported directly from the assets or from a security management system, such as a STEM system. Once the incident is identified along with information about the incident, enrichment information is obtained from various sources that relates to the incident, and a rule set is determined based on the enrichment information. For example, if the enrichment information indicated that an unknown process within the computing environment was malicious, a rule set may be determined that relates to malicious processes. Upon determination of the rule set, a set of action recommendations may be identified that are associated with the rule set, and can be provided to one or more administrators.

Once the rule set is identified, default module 609 may direct processing system 603 to identify a default SLA for the security incident based on the rule set. This default SLA may include a hierarchy or order of which to provide the action recommendations to the administrators, and may further provide a time period for which each of the administrators has to respond to the incident. For example, a SLA may provide two administrators that are capable of responding to the issue and specify a time period for each of the administrators to respond to the issue.

After determining the default SLA, environment module 610 may direct processing system 603 to obtain environmental characteristics related to the security incident. These characteristics may be determined from the computing assets themselves, including the number of occurrences of the incident, the amount that the incident has spread between the assets, or any other similar information from the assets. Further, the characteristics may be determined from one or more databases that include information about the severity of the particular incident, the criticality of the asset infected, the current geopolitical climate, or any other information that might relate to the environment. Based on the characteristics determined that are related to the security incident, modify module 611 directs processing system 603 to determine a modified SLA for the security incident based on environmental characteristics. This modification may include changing the set or hierarchy of administrators to respond to the incident, or increasing or decreasing the period of time available to respond to the incident.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer-implemented method performed by an advisement system coupled to a networked computing environment, the method comprising:
obtaining data indicating an occurrence of an incident in the networked computing environment;

identifying a recommended action for responding to the occurrence of the incident, the recommended action associated with a defined time period for receiving input associated with an administrator of the advisement system;
implementing a default action to contain a threat associated with the incident;
determining an effectiveness of the default action; and
modifying, based on the effectiveness of the default action, the defined time period for receiving input associated with an administrator of the advisement system for the recommended action.

2. The method of claim 1, further comprising identifying a criticality rating associated with a computing asset affected by the incident, wherein the defined time period for receiving input is further modified based on the criticality rating.

3. The method of claim 1, wherein the defined time period is further modified based on a time window in which the incident occurred.

4. The method of claim 1, further comprising identifying a severity level associated with the incident, and wherein the defined time period is further modified based on the severity level.

5. The method of claim 1, further comprising identifying a criticality rating associated with a computing asset affected by the incident, wherein the recommended action is identified based at least in part on the criticality rating.

6. The method of claim 1, further comprising identifying a rate of events associated with the incident, wherein the recommended action is identified based at least in part on the rate of events.

7. The method of claim 1, further comprising identifying environmental characteristics related to the incident, wherein the recommended action is identified based at in part on the environmental characteristics.

8. The method of claim 1, further comprising:
obtaining enrichment information associated with the incident, wherein identifying the recommended action is based at least in part on the enrichment information; and
modifying a default hierarchy of administrators to respond to the incident based on the enrichment information.

9. The method of claim 1, further comprising obtaining enrichment information associated with the incident from one of a database or a website based on information associated with the incident.

10. The method of claim 1, further comprising:
receiving input from an administrator to implement the recommended action; and
implementing the recommended action.

11. The method of claim 1, further comprising:
receiving input to modify the recommended action to obtain a modified recommended action; and
implementing the modified recommended action.

12. The method of claim 1, further comprising receiving input deferring selection of a recommended action to another administrator.

13. The method of claim 1, further comprising:
obtaining environmental characteristics associated with the incident; and
modifying the defined time period based at least in part on the environmental characteristics.

14. The method of claim 1, further comprising:
determining that the recommended action is not selected by an administrator within the defined time period; and
initiating an automated response to respond to the incident.

15. A non-transitory computer-readable storage medium storing instructions which, when executed by one or more processors, cause performance of operations comprising:
obtaining data indicating an occurrence of an incident in a networked computing environment;
identifying a recommended action for responding to the occurrence of the incident, the recommended action associated with a defined time period for receiving input associated with an administrator of an advisement system;
implementing a default action recommendation to contain a threat associated with the incident;
determining an effectiveness of the default action; and
modifying, based on the effectiveness of the default action, the defined time period for receiving input associated with an administrator of the advisement system for the recommended action.

16. The non-transitory computer-readable storage medium of claim 15, wherein the instructions, when executed by the one or more processors, further cause performance of operations comprising identifying a criticality rating associated with a computing asset affected by the incident, wherein the defined time period for receiving input is further modified based on the criticality rating.

17. The non-transitory computer-readable storage medium of claim 15, wherein the defined time period is further modified based on a time window in which the incident occurred.

18. An apparatus comprising:
one or more processors; and
a non-transitory computer-readable storage medium storing instructions which, when executed by the one or more processors, causes the apparatus to:
obtain data indicating an occurrence of an incident in a networked computing environment;
identify a recommended action for responding to the occurrence of the incident, the recommended action associated with a defined time period for receiving input associated with an administrator of an advisement system;
implement a default action to contain a threat associated with the incident;
determine an effectiveness of the default action; and
modify, based on the effectiveness of the default action, the defined time period for receiving input associated with an administrator of the advisement system for the recommended action.

19. The apparatus of claim 18, wherein the instructions, when executed by the one or more processors, further cause the apparatus to identify a criticality rating associated with a computing asset affected by the incident, wherein the defined time period for receiving input is further modified based on the criticality rating.

20. The apparatus of claim 18, wherein the defined time period is further modified based on a time window in which the incident occurred.

\* \* \* \* \*